United States Patent
Warner et al.

(10) Patent No.: US 6,212,301 B1
(45) Date of Patent: Apr. 3, 2001

(54) SYSTEMS AND METHODS FOR DIGITAL IMAGE COMPRESSION

(75) Inventors: Scott J. Warner, Hopkinton, MA (US); Anatholy F. Dedkov, Moscow (RU)

(73) Assignee: Accusoft Corporation, Westborough, MA (US)

( * ) Notice: Subject to any disclaimer, the term of this patent is extended or adjusted under 35 U.S.C. 154(b) by 0 days.

(21) Appl. No.: 09/209,598

(22) Filed: Dec. 11, 1998

Related U.S. Application Data

(60) Provisional application No. 60/090,584, filed on Jun. 25, 1998.

(51) Int. Cl.[7] .................................................. G06K 9/36
(52) U.S. Cl. .................................. 382/232; 382/233
(58) Field of Search ................................. 382/232, 233, 382/299; 707/500; 708/203; 345/202; 358/426, 433

(56) References Cited

U.S. PATENT DOCUMENTS

| | | | |
|---|---|---|---|
| 4,028,731 | 6/1977 | Arps et al. ............................ | 358/260 |
| 4,222,076 | 9/1980 | Knowlton ............................. | 358/263 |
| 4,345,245 * | 8/1982 | Vella et al. ............................ | 345/25 |
| 4,464,650 | 8/1984 | Eastman et al. ..................... | 340/347 |
| 4,558,302 | 12/1985 | Welch .................................. | 340/347 |
| 4,602,273 | 7/1986 | Carlson ................................. | 358/11 |
| 4,628,534 * | 12/1986 | Marshall ............................. | 382/299 |
| 4,701,745 | 10/1987 | Waterworth ........................ | 340/347 |
| 4,814,746 | 3/1989 | Miller et al. ........................ | 341/95 |
| 4,906,991 | 3/1990 | Fiala et al. ........................... | 341/51 |
| 5,001,478 | 3/1991 | Nagy .................................... | 341/67 |
| 5,016,009 | 5/1991 | Whiting et al. ..................... | 341/67 |
| 5,051,745 | 9/1991 | Katz ..................................... | 341/51 |
| 5,140,321 | 8/1992 | Jung .................................... | 341/55 |
| 5,155,484 | 10/1992 | Chambers, IV ..................... | 341/55 |
| 5,159,667 * | 10/1992 | Borrey et al. ....................... | 707/500 |
| 5,170,266 | 12/1992 | Marsh et al. ........................ | 358/468 |
| 5,390,262 | 2/1995 | Pope .................................... | 382/41 |
| 5,497,434 | 3/1996 | Wilson ................................ | 382/232 |
| 5,623,556 * | 4/1997 | Murayama et al. ................. | 382/233 |
| 5,724,070 | 3/1998 | Denninghoff et al. ............. | 345/202 |

OTHER PUBLICATIONS

*CCITT T42–Dimensional Compression Standard*, http://www.rasip.fer.hr/research/c...Igorithms/adv/fakscomp/index3.html, (Copyright 1997), pp. 1–4.

*The Design of Interactive Computational Media*, Department of Computer Science University of Toronto, http://www/dgp.toronto.edu/csc318/week9.htm, (Winter, 1997), pp. 1–8.

Fascimile Coding Shemes and Coding Control Functions for Group 4 Fascimile Apparatus, ITU–T Recommendation T–6, International Telecommunication Union, (1988), 11 pages.

*Graphics Interchange Format (sm)*, Version 89a, (GIF89a) CompuServe Incorporated, http://tronche.com/computer–graphics/gif/gif89a.html#appendix–e, (Jul. 31, 1990), pp. 1–29.

(List continued on next page.)

*Primary Examiner*—Jose L. Couso
*Assistant Examiner*—Anh Hong Do
(74) *Attorney, Agent, or Firm*—Testa, Hurwitz & Thibeault, LLP

(57) ABSTRACT

Systems and methods for compressing portions of a digital image, transmitting the compressed portions over a network, receiving them, decompressing them, and progressively displaying an image representing the original image. An encoder selects an interlaced portion of the original image based on a resolution factor and compresses each line of that portion by selecting the most efficient of multiple compression methods, including Group 3 and modified Group 4 coding schemes. Compressed portions of the original image are transmitted in successive stages, decompressed, and interlaced with the previously transmitted portions of the image, resulting in progressive enhancement of the transmitted, displayed image.

13 Claims, 12 Drawing Sheets

OTHER PUBLICATIONS

*Image Data Compression*, Chapter12. http://cs.sungshin.ac.kr/–hkim/LECTURE/ImgPro/Data Compression.htm, (Dec. 10, 1996), pp. 1–17.

*Standards for the Interchange of Raster Graphics*. http://www–exp.physik.uni–ulm.de/www$_{13}$ dl/cpages/faq/stand03.htm#GIF, (May 1995), pp. 1–12.

* cited by examiner

SYSTEMS AND METHODS FOR DIGITAL IMAGE COMPRESSION

CROSS REFERENCE TO RELATED APPLICATION

This application is based on and claims priority to U.S. Provisional Patent Application Serial No. 60/090,584, filed Jun. 25, 1998, entitled "Systems and Methods for Digital Image Compression," the entire contents of which are incorporated herein by reference.

FIELD OF THE INVENTION

The invention relates to systems and methods for data compression, and more particularly, to systems and methods for compressing a digital image.

BACKGROUND OF THE INVENTION

Historically, the transmission of digital images over computer networks has long been a part of modem informational technology. Special graphic formats have been developed to provide the ability to store digital images on storage media and to transmit them over computer networks. These graphic formats typically provide for compressing the image so that the image takes up less space when stored and/or takes less time to transmit over a network. Techniques have been sought and developed for the efficient compression of images in a progressive manner; that is, first an image with limited resolution is displayed, then the same image is displayed in successive stages with progressively greater resolution. Some graphic formats provide for progressive image transmission but typically for color images only. For instance, one format is based on a standard format from JPEG (Joint Photographic Experts Group). The JPEG format allows progressive transmission of color images up to about 16 million colors. Another format is the interlaced GIF (Graphics Interchange Format) created by Compuserve, Inc. The GIF format also allows progressive transmission of color images of 256 colors and even bi-level or bi-tonal images, but the compression methods do not provide for a very high level of compression, thus causing network traffic and delays when compressed images are transmitted over a network.

A very high level of compression for bi-level images is reached in Group 4 compression based on the ITU-T Group 4 specification from the ITU (International Telecommunication Union), formerly CCITT (International Consultative Committee for Telegraph and Telephone). The Group 4 compression scheme is used, for instance, in the TIFF (Tagged Image File Format) graphic format developed by Aldus Corporation and widely used for storing documents as digital images. The Group 4 compression scheme does not allow for progressive transmission but only for sequential transmission of lines in an image. This is due to a restriction on the Group 4 compression scheme whereby the compression of each row or line of the image currently being coded is based on the contents of the previous row (the reference line). Thus, the Group 4 coding scheme requires the compression of sequential lines in an image.

Therefore, one object of the invention is to provide methods for the high compression of bi-tonal and other images in a progressive manner and for on-demand enhancement of the displayed images. Another object is to provide a compression technique suitable for efficient, progressive display of images over a global network. Another object is to provide an interlacing approach to progressive compression based on multiple compression methods, including a modified Group 4 method, and adaptable to different levels of progressive compression.

SUMMARY OF THE INVENTION

The invention achieves the above objectives by providing methods for compressing a digital image in a progressive manner using the most efficient of several compression methods and transmitting a portion of the compressed image over a computer network, receiving it, decompressing it, and providing a displayed image representative of the original image.

In one aspect, the invention is understood as a method for compressing an image comprising lines of data, including the steps of (a) defining a segment of s consecutive lines in the image; (b) determining a selected line in the segment as a starting line; (c) determining a plurality of lines, beginning with the starting line, by selecting additional lines spaced by multiples of s from the starting line until no further of the additional lines can be selected from the image for the plurality of lines; (d) compressing each of the plurality of lines; (e) selecting a longest range of lines yet to be selected in the segment; (f) determining a middle line equally distant from the beginning and the end of the longest range of lines; (g) setting the middle line as the starting line; and (h) repeating steps (c) through (g) recursively until a predetermined limit of lines has been compressed.

In one embodiment, defining the segment includes setting s to a power of 2. In another embodiment, defining the segment includes defining the segment as the first s lines in the image. In an additional embodiment, determining the selected line includes determining a first line in the segment as the starting line.

In another embodiment, compressing each of the plurality of lines includes compressing each of the plurality of lines using a modified Group 4 coding scheme using a nearest previous selected line as a reference line.

In a further embodiment, determining a longest range of lines includes selecting a first longest range of lines. In an additional embodiment, the predetermined limit is based on a predetermined percentage of the total number of the lines in the image, and in a further embodiment, the predetermined percentage is preferably in the range of about 12.5% to about 50%.

In another embodiment, the method further includes transmitting a compressed plurality of lines using a communications media; receiving the compressed plurality of lines from the communications media; decompressing the compressed plurality of lines; and displaying the compressed plurality of lines as a displayed image representative of the image.

In other embodiments, compressing each of the plurality of lines includes providing a plurality of compression methods; compressing each of the plurality of lines by each of the plurality of compression methods; determining, for each line, a highest compression for the line by a selected one of the plurality of compression methods; and storing, for each of the lines, a highest compression line. In one embodiment, compressing each of the plurality of lines comprises compressing each of the plurality of lines using a Group 3 coding scheme and a modified Group 4 coding scheme. In another embodiment, storing a highest compression line includes affixing to the highest compression line an indicia identifying the selected one of the plurality of compression methods providing the highest compression. In a further embodiment, determining the highest compression for the line comprises selecting the highest compression providing a minimal bit length for the line.

BRIEF DESCRIPTIONS OF THE DRAWINGS

The invention is pointed out with particularity in the appended claims. The above and further advantages of this invention may be better understood by referring to the following description taken in conjunction with the accompanying drawings, in which:

Figure 4:
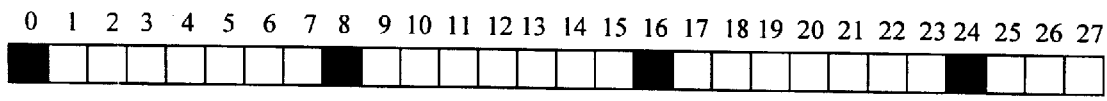
FIG. 4 depicts a representation of rows making up an image, including rows selected in a first compression pass for one embodiment of the invention.
Figure 5:
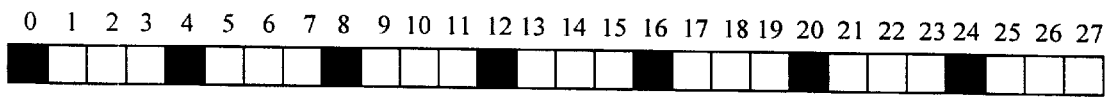
Figure 6:
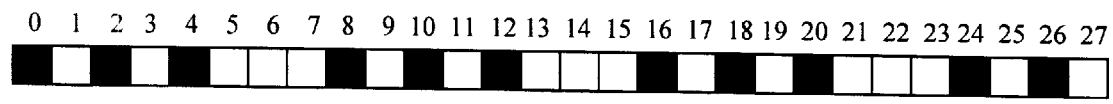
Figure 7:
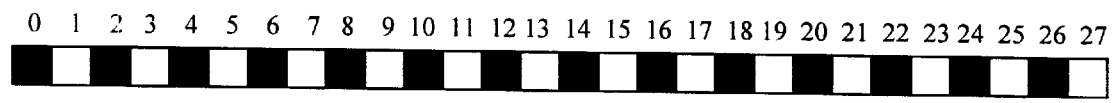
Figure 8:
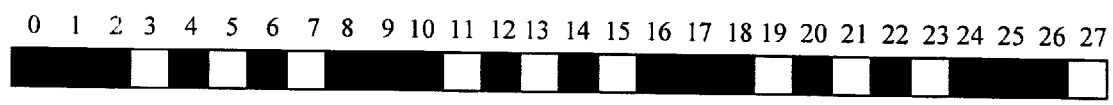
Figure 9:
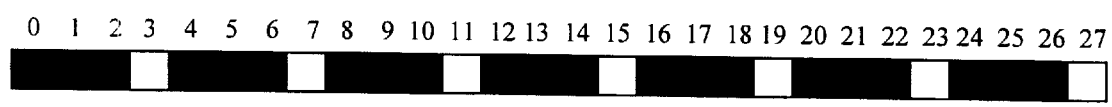
Figure 10:
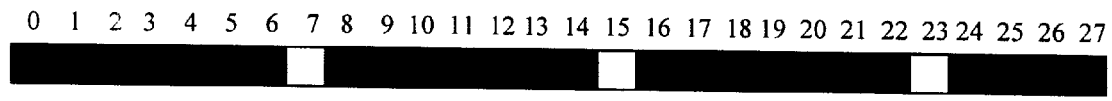
Figure 11:
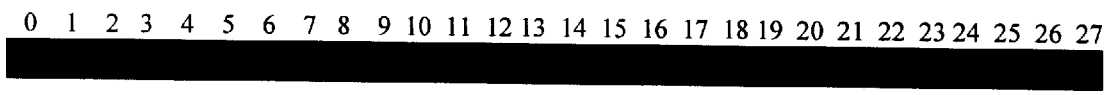
Figure 12:
Figure 13:
Figure 14:
Figure 15:
Figure 16:
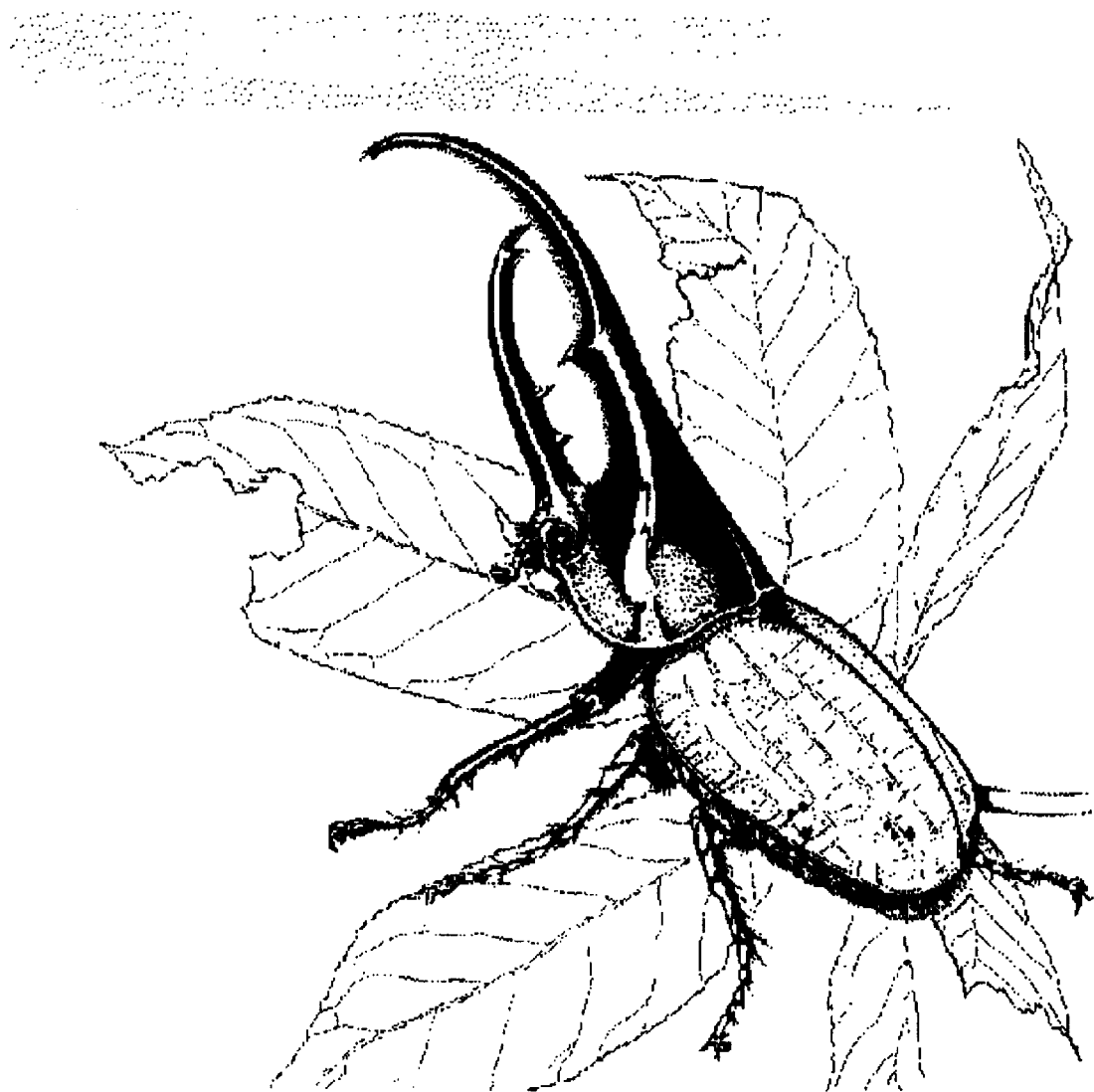

FIG. 5 additionally includes the rows selected after the second compression pass for the embodiment of the invention illustrated in FIG. 4;

FIG. 6 additionally includes the rows selected after the third compression pass for the embodiment of the invention illustrated in FIG. 4;

FIG. 7 additionally includes the rows selected after the fourth compression pass for the embodiment of the invention illustrated in FIG. 4;

FIG. 8 additionally includes the rows selected after the fifth compression pass for the embodiment of the invention illustrated in FIG. 4;

FIG. 9 additionally includes the rows selected after the sixth compression pass for the embodiment of the invention illustrated in FIG. 4;

FIG. 10 additionally includes the rows selected after the seventh compression pass for the embodiment of the invention illustrated in FIG. 4;

FIG. 11 additionally includes the rows selected after the eighth compression pass for the embodiment of the invention illustrated in FIG. 4;

FIG. 12 illustrates a sample displayed image after transmission of about 6% of the original image for one embodiment of the invention;

FIG. 13 illustrates the sample displayed image after transmission of about 13% of the original image represented in FIG. 12;

FIG. 14 illustrates the sample displayed image after transmission of about 25% of the original image represented in FIG. 12;

FIG. 15 illustrates the sample displayed image after transmission of about 50% of the original image represented in FIG. 12; and FIG. 16 illustrates the sample displayed image after transmission of 100% of the original image represented in FIG. 12.

DETAILED DESCRIPTION OF THE INVENTION

The invention relates to methods for compressing an image, transmitting a compressed portion of the image, receiving it, decompressing it, and producing a displayed image that represents the original uncompressed image.

Figure 1:
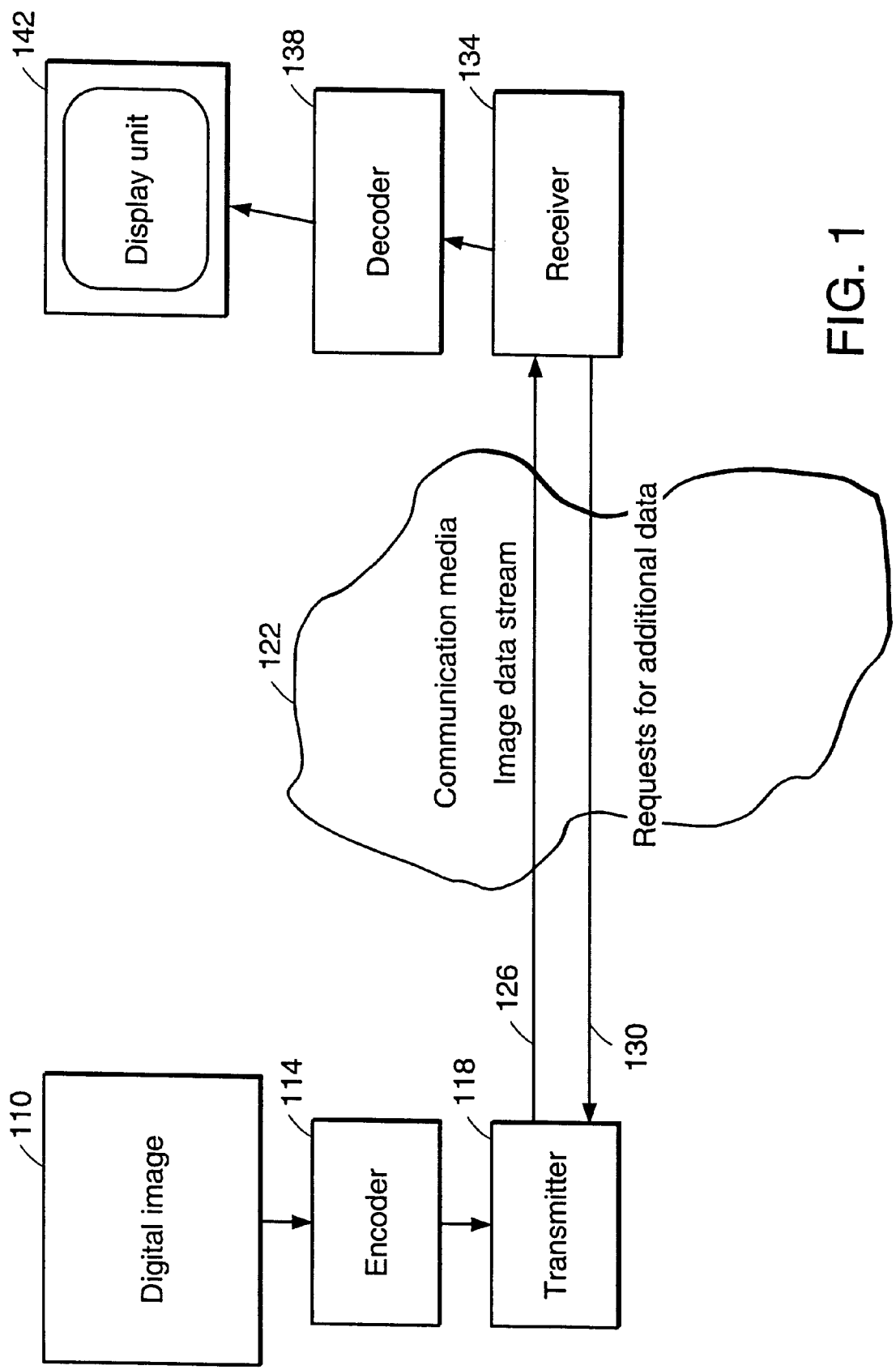
FIG. 1 depicts a functional block diagram of one embodiment of the invention illustrating an encoder, transmitter, receiver, decoder and other components.

FIG. 1 depicts a functional block diagram of the components in one embodiment of the invention. FIG. 1 includes a digital image 110, an encoder 114, a transmitter 118, a communications media 122, an image data stream 126, requests for additional data 130, a receiver 134, a decoder 138, and a display unit 142.

The digital image 110 is an original, uncompressed image composed of lines or rows of data. Typically the image 110 is a bi-level or two-tone image, such as white and black, in which the rows of data are composed of bits of data with 0 and 1 values. In one embodiment of the invention, the image may also be part of a multicolor image, in which the image 110 referred to in FIG. 1 is one bit plane in the multicolor image, each bit plane representing one color value. For example, a color image can be composed of 8 bit planes, representing 8 basic colors in the image. In one embodiment of the invention, an encoder 114 compresses each bit plane as though it were an image 110 (see FIG. 3).

The encoder 114 is a device or computer program that compresses the image 110. The encoder 114 passes a compressed portion of the image 110 to the transmitter 118 as an image data stream 126. The image data stream 126 is a continuous stream of data that the transmitter 118 transmits sequentially through a communications media 122 to a receiver 134.

The communications media 122 is any media suitable for transmitting electronic data, including, but not limited to, electronic wire or cable or optic cable In other embodiments, the communications media 122 may be based on any suitable part of the electromagnetic spectrum, such as visible light, infrared, microwave, or radio wave transmissions. In further embodiments, the communications media 122 is based on any communications media suitable for transmitting an image data stream of bits from one location to another. The communications media 122 may be a connection over a local computer network, such as a LAN, or a global computer network, such as the Internet.

The receiver 134 is a device or computer program that receives the image data stream 126 and passes it to the decoder 138. The decoder 138 decompresses the image data stream 126 that it has received and produces an uncompressed displayed image based on the original image 110. If only a portion of the original image 110 was sent to the decoder 138, then the displayed image is a representation of the original image 110, based on the portion of the original image 110 that was compressed, transmitted, and decompressed. In one embodiment, the decoder 138 also processes the decompressed image to make the displayed image more viewable, such as by performing anti-aliasing methods that smooth the appearance of rows and curves in the decompressed image. In another embodiment, the decoder 138 also processes the decompressed image to fill in gaps or holes in the decompressed image to make the displayed image appear more complete to the viewer. In further embodiments, the decoder 138 uses more sophisticated techniques, such as analysis by artificial intelligence or other means to modify the decompressed image to make displayed image even more understandable and viewable to the user.

In one embodiment, the encoder 114, transmitter 118, receiver 134, and decoder 138 are hard-wired electronic devices or ASIC (application specific integrated circuit) devices. In another embodiment, the encoder 114, transmitter 118, receiver 134 and decoder 138 are computer programs running on computer systems. A computer system may include an input device, a processor, a memory, and an output device. Optionally the computer system may include a display monitor for displaying the image 110. The computer system can be a IBM-compatible PC computer, other type of personal computer, UNIX or other workstation, minicomputer or mainframe computer. If the encoder 114 is a computer program, it may be implemented as a stand-alone software application, as a software object, or as part of a larger image storage and viewing software application. The encoder 114, transmitter 118, receiver 134, and decoder 138 are not required to be the same type of device or program. For example, in one embodiment, the encoder 114 is an ASIC device, the transmitter 118 is a computer system, the decoder 138 is another ASIC device, and the receiver 134 is a computer system. The encoder 114 and transmitter 118 are not required to be separate devices or computer programs. In one embodiment, for example, the encoder 114 and transmitter 118 can be based on one computer system, including coding and transmission programs running on the computer system, which also includes a storage device which stores the digital image 110. Such a storage device can be a diskette, a hard disk, a CD-ROM disk, data storage tape, other type of tape or diskette, or other storage device suitable for and commonly used for storing digital data. In another embodiment, the encoder 114, transmitter 118, and storage device are located on physically distinct devices that may be connected by a direct electronic lines, a LAN (local area network) or a WAN (wide area network).

Likewise, the receiver 134 and decoder 138 are not required to be separate devices or computer programs. In one embodiment, for example, the receiver 134 and decoder 138 can be based on one computer system, which also includes a display unit 142. The display unit 142 may be any suitable display device for digital images including a computer display monitor, a television, a LCD or active matrix display or any other electronic display device suitable for displaying digital images in a viewable format or for converting digital images to a viewable format for display. In another embodiment, the receiver 134, decoder 138, and display unit 142 are based on physically distinct devices and are connected by direct physical lines, a LAN, or WAN.

In further embodiments, different combinations of programs, devices, and computer systems may be used to implement the components illustrated in FIG. 1.

Requests for additional data 130 may also be transmitted over the communications media 122. Typically, such a request 130 is a request for an additional portion of the original image 110 to be compressed, transmitted, and decompressed. In a further embodiment, the request 130 is for any other associated data about the image 110 that may be useful in receiving the image data stream 126, decompressing it, and producing the resulting displayed image.

Figure 2A:
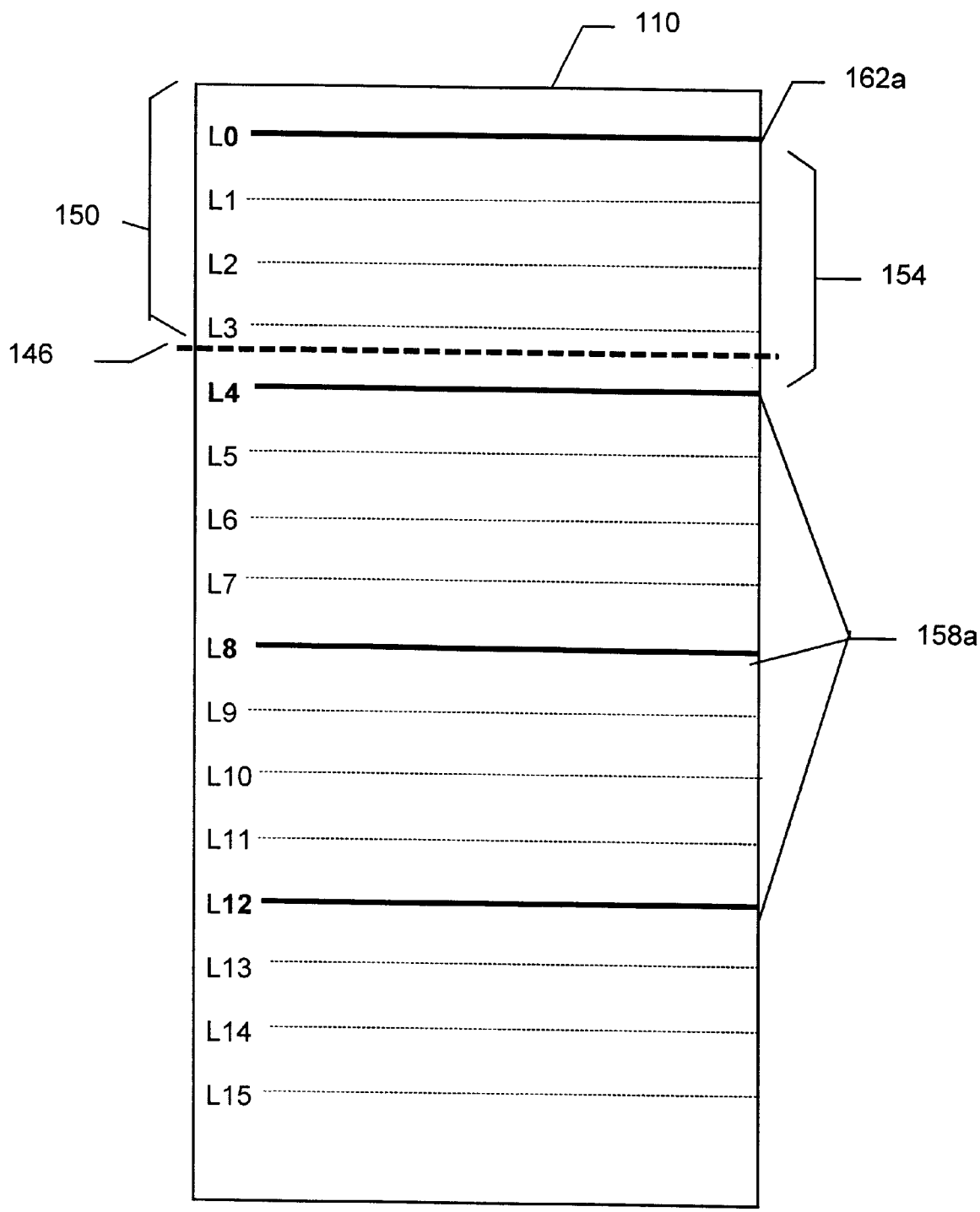
FIG. 2A depicts a digital image illustrating the selected rows in a first compression pass, for one embodiment of the invention.

FIGS. 2A, 2B, 2C, 2D illustrate a digital image 110 in different stages of the compression process. FIG. 2A depicts a digital image 110 illustrating the selected rows 158a, 162a in a first compression pass, for one embodiment of the invention. FIG. 2A shows a digital image 110, a marking line 146 that defines a segment 150 in the image 110, a spacing factor 154, a selected starting row 162a, and additional selected rows 158a in the image 110. The marking line 146 is a line in the FIG. 2A used to define a segment 150 and does not indicate a row or line of data inserted in the image 110. The segment 150 indicates a segment of four rows equal in number to the spacing factor 154, which has a value of 4 in FIGS. 2A, 2B 2C, 2D. In the embodiment shown in FIG. 2A the segment 150 is the initial four rows or lines (that is, L0, L1, L2, L3) of the image 110 determined by the value of the spacing factor 154. In an alternate embodiment the segment 150 is not required to be the first rows in the image 110, but can be located elsewhere in the image 110, as long as the segment 150 consists of consecutive rows equal in number to the spacing factor 154.

The starting row 162a, together with additional selected rows 158a, make up the selected rows 158a, 162a in the image 110 for FIG. 2A. In the embodiment shown in FIG. 2A, the starting row 162a is the first row or line (L0 in the image 110) in the segment 150, although this is not a requirement of the invention. Additional selected rows 158a (L4, L8, L12 in the image 110) are spaced from the starting line or row 162a by the spacing factor 154. The selected rows 158a, 162a are then compressed in a first compression pass. More details on the row selection and compression process will be discussed with respect to FIG. 3.

Figure 2B:
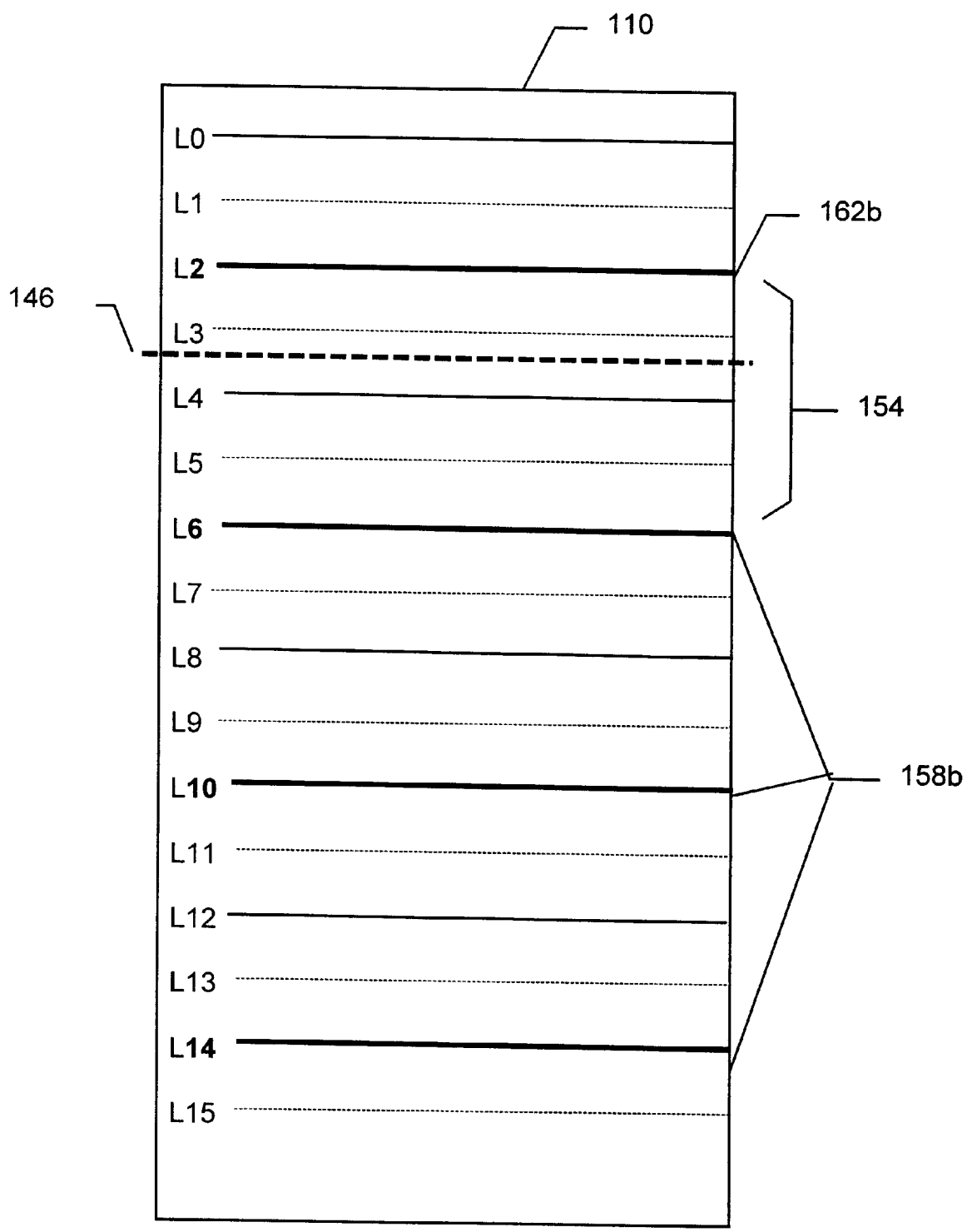
FIG. 2B depicts the selected rows for a second compression pass of the image for the embodiment of the invention illustrated in FIG. 2A.
Figure 3:
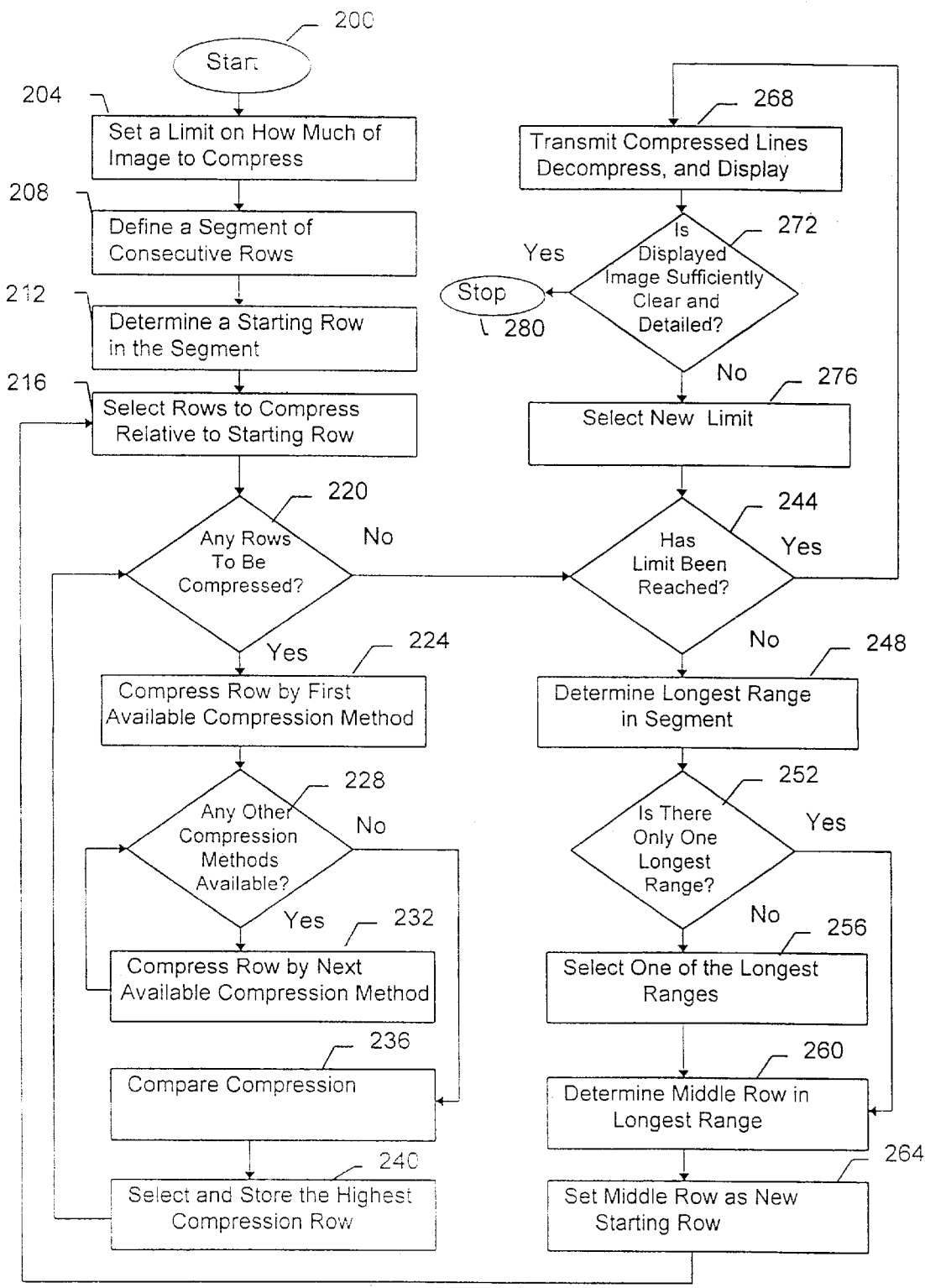
FIG. 3 depicts a flow chart for one embodiment of the invention, illustrating the process for compressing a portion of an image, transmitting it, decompressing it, and providing a displayed image.

FIG. 2B shows L2 as the starting line or row 162b, which is selected as the starting row if the viewer of the displayed image requests a second compression pass (see FIG. 3). The additional selected lines or rows 158b (L6, L10, L14) in FIG. 2B are spaced from the starting line or row 162b by the spacing factor 154. The starting row 162b is chosen as the middle row of the longest range of unselected rows in the segment 150. See the discussion associated with FIG. 3 for more discussion of how a starting row 162 is chosen. The selected rows 158b, 162b are then compressed in a second compression pass.

Figure 2C:
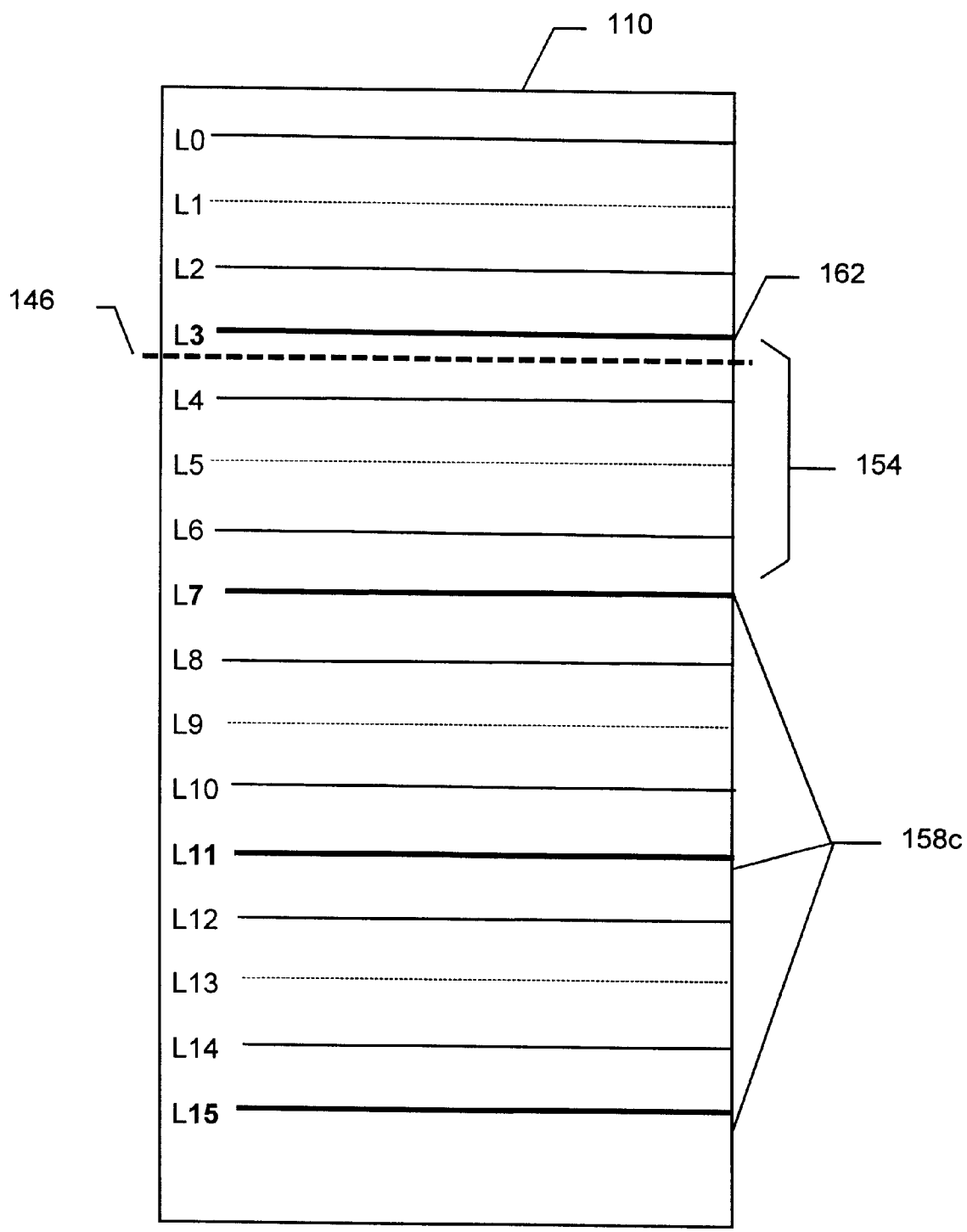
FIG. 2C depicts the selected rows for a third compression pass of the image for the embodiment of the invention illustrated in FIG. 2A.

FIG. 2C shows L3 as the starting row 162c, which is selected as a starting row if the viewer of the displayed image requests a second compression pass. The additional selected lines or rows 158c (L7, L11, L15) in FIG. 2C are spaced from the starting row 62c by the spacing factor 154. The selected rows 158c, 162c are then compressed in a third compression pass.

Figure 2D:
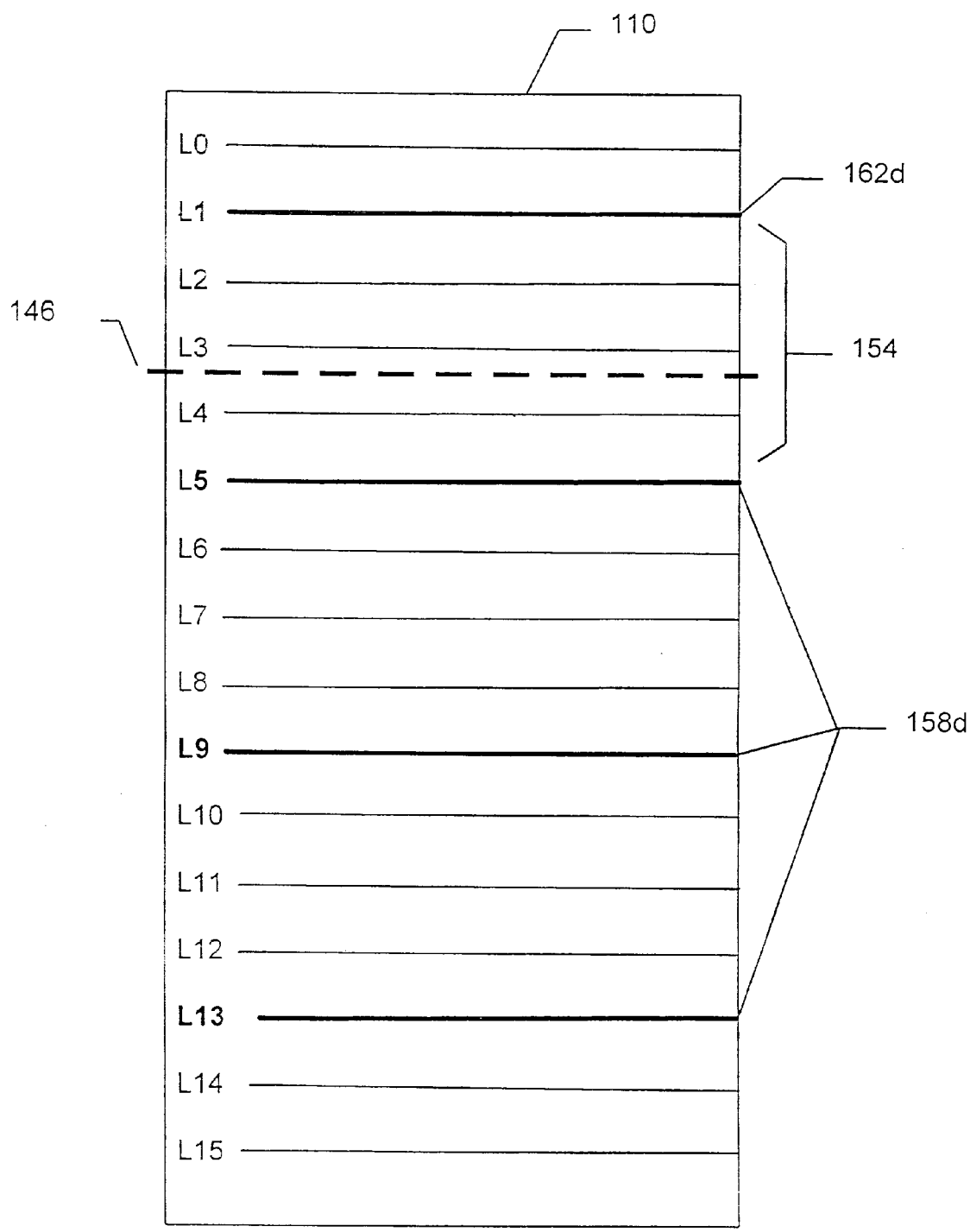
FIG. 2D depicts the selected rows for a fourth compression pass of the image for the embodiment of the invention illustrated in FIG. 2A.

FIG. 2D shows L1 as the starting line or row 162b, which is selected as a starting row if the viewer of the displayed image requests a fourth compression pass. The additional selected lines or rows 158d (L5, L9, L13) in FIG. 2D are spaced from the starting line or row 162d by the spacing factor 154. The selected rows 158d, 162d are then compressed in a fourth compression pass.

Table 1 summarizes the compression passes illustrated in FIGS. 2A–2D.

TABLE 1

| Compression Pass | Lines Selected |
|---|---|
| 1 | L0,L4,L8,L12 |
| 2 | L2,L6,L10,L14 |
| 3 | L3,L7,L11,L15 |
| 4 | L1,L5,L9,L13 |

FIG. 3 depicts a flow chart of one embodiment of the invention, illustrating the process for compressing an image. At the start of the process (step 200) an image 110 has been selected for viewing. In one embodiment, a user selects the image 110 from a site remote from where the local site where user is located. The local and remote site can be connected by a communications media 122, as previously discussed. Typically the user sets a limit on how much of the image is to be compressed (step 204). This limit can be indicated by a percentage of the image to be compressed in one pass, or by a resolution factor 54. For example, if a resolution factor has a value of 8, this value indicates that one-eighth of the image 110 will be compressed on the first and each subsequent pass. The resolution factor 154 is also known as an interlacing factor (ILF) or spacing factor.

For example, the user selects one compression pass at a resolution factor 154 with a value of 8, which means that one-eighth of the image is displayed to her. Then the user determines if she wants to see more of the image 110, in which case she selects a higher limit, such as two compression passes, in which case an additional eighth of the image 110 is compressed, transmitted, decompressed, interlaced with the previous eighth of the image 110 that was previously displayed, and resulting in a displayed image that represents one-quarter of the original image 110.

The next step is defining a segment 150 of consecutive rows based on the percentage or resolution factor 154 (step 208). In one embodiment a compression module or encoder 114 defines the segment 150. In one embodiment, the number of rows in the segment 150 is equal to the resolution factor 154. Thus, if the resolution factor 154 has a value of 8, then the number of rows in the segment 150 is 8. In one embodiment, the encoder 114 chooses the segment 150 to be the first rows in the image 110. For example, if the resolution factor 154 has a value of 8, then the segment 150 is the first eight rows in the image 110. In one embodiment, the resolution factor 154 is a power of 2. In another embodiment, the resolution factor 154 is an even number. In a further embodiment, the resolution factor 154 is only required to be a whole number.

The encoder 114 then determines a starting row 162 in the segment 150 (step 212). In one embodiment, this is the first row in the segment 150, but in other embodiments of the invention, the starting row 162 can be any row in the segment 150.

Then the encoder 114 selects a plurality of rows or a set of rows to compress chosen relative to the starting row 162 (step 216). In one embodiment, the selected rows 158 are each spaced by a multiple of the resolution factor 154 from the starting row 162.

In the first pass the encoder 114 determines that no rows have yet been compressed and that the selected rows 158, 162 must be compressed (step 220). The encoder 114 then compresses the first selected row by a compression method (step 224). In one embodiment, the encoder 114 is not required to select the first selected row in the set of rows determined in step 216, but can select any row to compress first.

If only one compression method is available, then the encoder 114 compresses the selected row using that compression method (step 224). If more than one compression method is available, then the encoder 114 compresses the selected row by the first available compression method, or, alternatively, by any compression method that is available (step 224). If other compression methods are available, the encoder 114 then compresses the same selected row by all of the compression methods until all or a subset of the available compression methods have been used (steps 228 and 232). The encoder 114 then compares the results of compressing the selected row by all or a subset of the available compression methods (step 236) and determines which method produced the highest compression; that is, the shortest compressed row (step 240). In one embodiment, this shortest row is the resulting compressed row with the least number of bits compared to the number of bits in other compressed rows for the same selected row. The encoder 114 then selects and stores the highest compression row (step 240). In one embodiment, the encoder 114 tags each compressed line to indicate what compression method was used to compress the line.

The encoder 114 then determines if any more rows remain to be compressed in the selected set of rows (step 220). If additional rows remain to be compressed, then the encoder 114 repeats steps 220–240 until all of the rows in the selected set of rows have been compressed.

The encoder 114 then determines if the limit (initially set in step 204) has been reached (step 244). In one embodiment, the user selects the limit before viewing the image 110. For example, if the user originally requested two passes at a resolution value of 8 and only one pass has been completed, then the encoder 114 continues the compression process. Alternatively, the user has viewed the image 110 and increased the limit, so that the encoder 114 continues. The encoder 114 continues the compression process by next determining the longest range of not yet compressed rows in the segment 150 (step 248). For example, if the resolution factor 154 has a value of 8 and the encoder 114 has completed one compression pass, then the longest range available in the segment 150 is seven rows. The encoder 114 then determines if there is only one longest range in the segment 150 or two or more ranges that are all longest and equally long (step 252). If there are two or more ranges that are all longest ranges, then the encoder 114 selects one range as a selected longest range (step 256). In one embodiment, this selection is done by selecting the longest range in the segment 150 that is closest to the beginning of the segment 150, or, in an alternate embodiment, selecting the longest range in the segment 150 that is closest to the end of the segment 150. The method used to select longest range is not required to follow any rule, and can be chosen by any method, including a random selection, so long as one of the longest ranges is determined to be a selected longest range.

The encoder 114 then determines the middle row in the selected longest range (step 260). For example, if the resolution factor 154 has a value of 8 and the longest range in the segment 150 is rows 1–7 of an image 110, then the middle row is row 4.

In one embodiment, the resolution factor 154 has a value that is not an even number. For example, if the resolution factor 154 has a value of 11 and the longest range in the segment 150 is rows 1–10 of an image 110, then there is no single middle row; that is, either row 5 or row 6 could be chosen as a middle row. The encoder 114 can chose either row 5 or 6 as the middle row, using any method that allows a choice between rows 5 and 6 to be made. The encoder 114 then sets this middle row as a new starting row 162 (step 264).

The encoder 114 selects a new set of selected rows based on the new starting row 162 (step 216), and proceeds to compress all the rows in the set of selected rows (steps 220–240). The encoder 114 then determines if the limit has been reached (step 244). If not, then the encoder 114 determines a new starting row 162 and new set of selected rows 158, 162 and compresses them (steps 248–264, then steps 216–240).

If the limit has been reached (step 244), then the encoder 114 passes the compressed rows, which represent a compressed portion of the original image 110, to a transmitter 118, which transmits the compressed portion of the image 110 via a communications media 122 to a receiver 134, which then passes the compressed portion of the image 110 to a decoder 138, which decodes and produces a displayed image (step 268). The user viewing the displayed image then determines if this image is sufficiently clear and detailed enough to understand it (step 272). If the displayed image is not sufficiently clear, the user can set a new limit on how much of the image 110 to be compressed, transmitted, decompressed, and displayed (step 276). Alternatively, the user can decide to set a new limit for other reasons. For example, the displayed image may be sufficiently detailed for viewing on a screen, but the user may want to obtain 100% of the original image 110 for local storage of it or for local printing out of a high quality printout of the image 110. The new limit is then transmitted back to the encoder 114 (not explicitly shown on FIG. 3). The encoder 114 determines that the new limit has not been reached (step 244) and then repeats the compression process (steps 248–264, then steps 216–240) on the same image 110, thus determining a set of new selected rows 158, 162 that have not been previously compressed, and then compresses them. When the new limit is reached (step 244), then the newly compressed portions of the image 110 are transmitted, decompressed, and displayed to the user (step 268). The user can then decide whether a sufficient amount of the original image 110 has been transmitted to her to be clear and understandable, and whether she chooses to have further portions of the image 110 compressed and sent to her (step 272) by selecting a further, higher limit (step 276). This process can continue until the user is satisfied or the whole image 110 is transmitted to her (step 280). The process is then complete, unless the user chooses a new image 110 to view and starts the process again (step 200).

Other embodiments of the invention may implement the process in more detail. One such embodiment is NetVue™ from AccuSoft Corporation, Westborough, Mass. The following describes such a particular embodiment.

In such an embodiment, the bi-level image 110 being transmitted is initially kept in an arbitrary digital image format. The encoder 114 first loads the image 110 into the computer memory and decodes the image 110 from its original representation. The internal representation of the image 110 being transmitted uses different formats. In one embodiment, the image 110 is presented as a set of raster lines containing 0's and 1's or in some other format, for example, in run-ends format.

Run-ends format is a type of run-length compression that compresses data based on the next changing column, which is a column where a bit in a row changes value. For example, assume the following row of data:

| Columns: | 1 | 5 | 11 | 18 | 26 |
|---|---|---|---|---|---|
| Bits: | 00000111110000000111111110000000000 | | | | |

The compressed line would be stored using the following values: 5, 11, 18, 26, etc. In the sample line of data shown above, the first color is assumed to be black or background, with a 0 value. If the first color is white, then a 0 would be the first value in the compressed line. Using this method, a pixel at a given column number can readily be determined to be black or white. In addition, using this approach, most image processing algorithms execute more quickly.

Each given transmission is characterized by the interlacing factor (ILF), also termed a resolution or spacing factor 154. In practice the interlacing factor may have value from 2 to 32. In another embodiment, the ILF is a power of 2, as discussed previously. Both the transmitter 118 and receiver 134 must know the ILF of the image 110 being transmitted.

Each digital image 110 is a rectangular area of pixels (picture elements) defined by parameters for Height rows and Width columns. The Height and Width parameters are sent by the transmitter 118 to the receiver 134 at an initial stage of transmission.

The encoder 114 codes the image rows, and the transmitter 118 sends them to the receiver 134 on a row-by-row basis, but the sequence of rows is not a sequential order of rows in the image 110 but is an interlaced order as described below.

The image data stream 126 that is transmitted from the transmitter 118 to the receiver 134 is a sequence of bits. In one embodiment, the bit sequences that correspond to different rows are not separated one from another, thus allowing maximal packing of bits. Other embodiments of the invention employ row separators to distinguish where a new row begins in the sequence of bits in the image data stream 126.

The coding of the entire original image 110 involves several passes through the original image 110. The number of passes is equal to the interlacing or spacing factor 154. On each pass a portion of the image 110 is coded and transmitted. In one embodiment of the invention, the transmission of the image 110 can start in parallel with the coding, thus minimizing delays. In another embodiment of the invention, the encoder 114 compresses the entire image 110 first and then transmits the compressed image using the image data stream 126.

FIGS. 4 through 11 show an example of the compression of an image 110 in eight passes. In the example shown in FIGS. 4 through 11, the ILF is set at a value of 8. Each row is indicated by a number and a square in FIGS. 4 through 11. Rows that have been compressed and transmitted are shown in black. For example, row 0 is indicated by a black box in FIG. 4, which represents bits in row 0 that have been compressed. On the first pass, the sequence of rows is determined by 0, ILF, 2*ILF, 3*ILF, 4*ILF, etc., as shown by rows 0, 8, 16, and 24 in FIG. 4.

On each subsequent i-th pass the initial or starting row 162, also termed Ri, is chosen in such a way that its value divides the maximal range of yet unsent rows into two approximately equal parts. The sequence of rows on i-th pass is: Ri, Ri+ILF, Ri+2*ILF, Ri+3*ILF, ... etc. (See also the discussion associated with FIG. 3.)

FIG. 5 shows that additional rows (4, 12, 20, etc.) have been selected for Ri equal to 4 (all rows selected up to this point are colored black). FIG. 6 illustrates that additional rows (2, 10, 18, 26, etc.) that have been selected for Ri equal to 2. FIG. 7 illustrates that additional rows (6, 14, 22, etc.) have been selected for Ri equal to 6. Thus, after the first ILF/2 passes are done, the encoder 114 has compressed and transmitted all the even rows, but has not compressed and transmitted any of the odd rows.

In one embodiment, for the compression and transmission of the second half of the image 110, the order of rows is selected arbitrarily. In another embodiment, to obtain the best possible quality of the displayed image on each stage of the transmission, the encoder 114 chooses a sequence of rows such that there is a maximal uniform distribution of sent and unsent rows. For instance, this distribution is shown in the rows selected in FIGS. 8 through 11. FIG. 8 illustrates the additional rows (1, 9, 17, 25, etc.) have been selected for Ri equal to 1. FIG. 9 illustrates that additional rows (5, 13, 21, etc.) have been selected for Ri equal to 5. FIG. 10 illustrates that additional rows (3, 11, 19, 27 etc.) have been selected for Ri equal to 3. FIG. 11 illustrates that additional rows (7, 15, 23, etc.) have been selected for Ri equal to 7. Table 2 summarizes the rows selected in each compression pass.

TABLE 2

| Compression Pass | Rows Selected |
| --- | --- |
| 1 | 0,8,16,24 |
| 2 | 4,12,20,28 |
| 3 | 2,10,18,26 |
| 4 | 6,14,22,30 |
| 5 | 1,9,17,25 |
| 6 | 5,13,21,29 |
| 7 | 3,11,19,27 |
| 8 | 7,15,23,31 |

The coding of the each row involves the following steps:

First, each coded row is prefixed with the two-bit tag describing the method of coding used for this row. The possible values are:

00—Group-4 compression using nearest previous row as a reference line

01—Group-4 compression using nearest next row as a reference line

10—Group-3 compression

11—empty row (1) or uncompressed row (2)

Group 3 and 4 both refer to ITU-T specifications which, in one embodiment, may be modified from the basic ITU-T specifications. In particular, the Group 4 method is modified to allow use of a reference line that is not the immediately adjacent line in the uncompressed image 10. In other embodiments, any compression method that uses a reference line immediately adjacent to the line being compressed may be used if modified to use a nonadjacent reference line, as described here for Group 4 coding.

The Group 4 compression method is most efficient when the current line being compressed and the reference lines are similar (for example, the black pixels in the two lines are in the same or almost the same locations). The Group 4 compression is efficient when applied to text images. This occurs due to the shapes of alphanumeric characters, with the result that a remote reference line may have black pixels in similar locations to the black pixels in the current line being compressed.

The treatment of the tag set to one-one may vary for different images 110. The encoder 114 determines what approach to use. The transmitter 118 and receiver 134 should agree on the approach to be used at the initial stage of the transmission. The transmitter 118 and receiver 134 use a packet-based exchange protocol to establish an agreement on the approach to be used for the tag set to one-one. For images 110 with large white fields, the treatment of a tag set to one-one as an empty line is more efficient. For images 110 containing a lot of rows with randomly intermixed white and black pixels, treatment of a tag set to one-one as an uncompressed row is more efficient.

On coding of each j-th row, the encoder 114 performs the following steps:

a. If the current coded row is an empty row and the tag set to one-one is treated as an empty row, then the encoder 114 writes the tag set to one-one into the output stream with no more extra-bits.

b. The encoder 114 estimates the bit length B0 of this row as it being coded with Group 3 compression c. The encoder 114 estimates the bit length B1 of the current row for coding it with Group 4 compression using the nearest previous row that already has been coded before as the reference line (as a consequence the reference line is already known to the decoder 138). The nearest previous row that has already been coded is not necessarily the nearest line physically to the encoded line in the original image 110. For instance, while coding row 12 on pass 2 in the example given above in FIG. 5, the encoder 14 uses row 8 as a reference line.

d. The encoder 114 estimates the bit length B2 of the current row for coding it with Group 4 compression using the nearest next row that already has been coded before as the reference line (as a consequence the reference line is already known to the decoder 138). For instance, when the encoder 114 compresses row 12 on pass 2 using Group 4 compression in FIG. 5, the encoder 114 uses row 16 as a reference line.

e. If the 11 tag is treated as an uncompressed line, then the encoder 14 estimates the original (uncompressed) bit length B3 of the current line.

f. The minimal value of B0, B1, B2 and B3 is chosen.

The encoder 114 prefixes the current row with the tag value, encodes it according to the chosen compression scheme, and writes the compressed row to the output image data stream 126, which is sent to the receiver 134. Alternatively, the encoder 114 sends the uncompressed representation of the current row, if the B3 value is minimal.

On pass 1, the B1 bit length is not estimated, and the 01 tag never appears in a coded bit stream.

In conjunction with using of the efficient Group 3 or 4 coding schemes, this coding method results in progressive image coding with the compression ratios comparable with Group 4 efficiency. In one embodiment of the invention, the actual size overheads vary for different images 110 and are typically a percentage in the range of −10% to 20%. The actual size overhead, Y, means that if an image file's original size is X, then the total data transmitted is typically X+Y. For some images 110 the coding scheme provides an even better compression ratio than if only the Group 4 coding scheme is used.

After the image data stream 126 begins to arrive to at the receiver 134, the receiver 134 passes this data to the decoder 138. The decoder 138 first analyzes the two-bit tag (00, 01, 10, 11) and determines what compression scheme to use for this row. Then it decodes the current row according to the given compression scheme.

On each stage of decompression, the decoder 138 constructs the displayed image from the decompressed data by first defining rows in the displayed image based on the rows that have been transmitted and decompressed. Each not yet defined row is assumed to have the same bit values as the nearest previous already defined row. For instance, on pass 1 (see FIG. 4), the decoder 138 assumes rows 1, 2, 3, 4, 5, 6, 7 have the same bit values as defined row 0 in the displayed image. On pass 2 (see FIG. 5), the decoder 138 assumes that rows 1, 2, 3 have the same bit value as defined row 0, and rows 5, 6, 7 have the same bit value as defined row 4 in the displayed image, and so on. This allows the display unit 142 to display a more complete appearing low-resolution image just after pass 1 and/or pass 2 data are received. FIG. 12 shows such a displayed image.

After pass 1 data are sent to the receiver 134, the transmitter 118 stops further transmission. In one embodiment, the encoder 114 may continue to code an image 110 "in advance" of an actual request or transmission.

The transmitter 118 continues data transmission only after a request for an additional portion of the image 110 is received from the receiver 134. The receiver 134 sends the request to the transmitter 118 requesting it to send data from the next compression pass. The events causing this request may be one of the following:

The currently received number of rows is not enough to display the image with the resolution available for the display unit 142.

The displayed image is zoomed-in. The user has enlarged the image to zoom in on viewing a part of it, and thus wants a higher level of resolution in the displayed image.

The user explicitly requests image quality enhancement for the displayed image.

After the receiver 134 receives data from the next compression pass, the decoder 138 decompresses the data and the data is integrated into the currently displayed image, thus enhancing the quality of the image. For instance, after pass 3 data are received (see FIG. 6), row 2 is defined by using the transmitted and decompressed row 2 bit values from the pass 3 data. Then, the decoder 138 assumes that row 1 has the same bit values as previously defined row 0, and row 3 has the same bit values as previously defined row 2.

The process continues until one of the following events occur:

All data from the original image 110 are transmitted, and the viewed image is displayed with the maximal possible resolution/quality.

The user aborts the process of transmission being satisfied with the current displayed image quality. In fact, 300 dpi (dots per inch) text images 110 are typically fully readable after 50% of the image data are transmitted.

The user aborts the process of transmission after determining that this image 110 is not the desired image.

FIGS. 12–16 illustrate a displayed image based on progressive transmission of portions of an original image 110, using an interlacing or spacing factor 154 with a value of 16, for one embodiment of the invention. FIG. 12 shows the displayed image after pass 1 and about 6% of the image 110 has been transmitted. FIG. 13 shows the displayed image after pass 2 and about 13% of the image 110 has been transmitted. FIG. 14 shows the displayed image after pass 4 and 25% of the image 110 has been transmitted. FIG. 15 shows the displayed image after pass 8 and 50% of the image 110 has been transmitted. FIG. 16 shows the displayed image after pass 16 and 100% of the image 110 has been transmitted. As can be seen from these figures, a recognizable image may be seen at low resolution (see FIG. 13), and a more clear image can be seen at low to moderate resolutions (see FIG. 14 and 15).

Having described the preferred embodiments of the invention, it will now become apparent to one of skill in the art that other embodiments incorporating the concepts may be used. It is felt, therefore, that these embodiments should not be limited to the disclosed embodiments.

What is claimed is:

1. A method for compressing an image comprising lines of data, comprising the steps of:
   (a) defining a segment of s consecutive lines in said image;
   (b) determining a selected line in said segment as a starting line;
   (c) determining a plurality of lines, beginning with said starting line, by selecting additional lines spaced by multiples of s from said starting line until no further of said additional lines can be selected from said image for said plurality of lines;
   (d) compressing each of said plurality of lines;
   (e) selecting a longest range of lines yet to be selected in said segment;
   (f) determining a middle line equally distant from the beginning and the end of said longest range of lines;
   (g) setting said middle line as said starting line; and
   (h) repeating steps (c) through (g) recursively until a predetermined limit of lines has been compressed.

2. The method of claim 1 wherein said step of defining said segment comprises a step of setting said s to a power of 2.

3. The method of claim 1 wherein said step of defining said segment comprises a step of defining said segment as the first s lines in said image.

4. The method of claim 1 wherein said step of determining said selected line comprises a step of determining a first line in said segment as said starting line.

5. The method of claim 1 wherein said step of compressing each of said plurality of lines comprises the steps of:
   providing a plurality of compression methods;
   compressing each of said plurality of lines by each of said plurality of compression methods;
   determining, for each line, a highest compression for said line by a selected one of said plurality of compression methods; and
   storing, for each of said lines, a highest compression line.

6. The method of claim 5 wherein said step of compressing each of said plurality of lines comprises compressing each of said plurality of lines using a Group 3 coding scheme and a modified Group 4 coding scheme.

7. The method of claim 5 wherein said step of storing a highest compression line comprises affixing to said highest compression line an indicia identifying said selected one of said plurality of compression methods providing said highest compression.

8. The method of claim 5 wherein said step of determining said highest compression for said line comprises selecting said highest compression providing a minimal bit length for said line.

9. The method of claim 1 wherein said step of compressing each of said plurality of lines comprises compressing each of said plurality of lines using a modified Group 4 coding scheme using a nearest previous selected line as a reference line.

10. The method of claim 1 wherein said step of determining a longest range of lines comprises selecting a first longest range of lines.

11. The method of claim 1 wherein said predetermined limit is based on a predetermined percentage of the total number of said lines in said image.

12. The method of claim 11 wherein said predetermined percentage is preferably in the range of about 12.5% to about 50%.

13. The method of claim 1 further comprising the steps of:
   transmitting a compressed plurality of lines using a communications media;
   receiving said compressed plurality of lines from said communications media;
   decompressing said compressed plurality of lines; and
   displaying said compressed plurality of lines as a displayed image representative of said image.

\* \* \* \* \*